United States Patent

Adachi et al.

[11] Patent Number: 6,049,750
[45] Date of Patent: Apr. 11, 2000

[54] SPEED CHANGE RATIO CONTROLLER FOR CONTINUOUSLY VARIABLE TRANSMISSION

[75] Inventors: Kazutaka Adachi, Yokohama; Hiroyuki Ashizawa, Fujisawa, both of Japan

[73] Assignee: Nissan Motor Co., Ltd., Yokohama, Japan

[21] Appl. No.: 09/056,666

[22] Filed: Apr. 8, 1998

[30] Foreign Application Priority Data

Apr. 8, 1997 [JP] Japan .................................. 9-089494

[51] Int. Cl.[7] ................................... F16H 35/00
[52] U.S. Cl. ................................ 701/51; 701/53; 477/46; 477/48; 74/886
[58] Field of Search ................... 701/51, 53; 74/886; 477/46, 48

[56] References Cited

U.S. PATENT DOCUMENTS

| 5,144,864 | 9/1992 | Sawasaki et al. | 74/866 |
|---|---|---|---|
| 5,612,873 | 3/1997 | Ogawa | 701/51 |
| 5,672,137 | 9/1997 | Adachi et al. | 477/45 |
| 5,788,599 | 8/1998 | Adachi et al. | 477/45 |
| 5,820,514 | 10/1998 | Adachi | 477/46 |
| 5,857,937 | 1/1999 | Ashizawa et al. | 477/46 |
| 5,908,367 | 6/1999 | Tominaga et al. | 477/45 |
| 5,908,461 | 6/1999 | Tsukamoto et al. | 701/56 |

FOREIGN PATENT DOCUMENTS

| 0 281 850 | 9/1988 | European Pat. Off. . |
| 0 281 947 | 9/1988 | European Pat. Off. . |
| 196 14 545 | 10/1996 | Germany . |
| 196 16 384 | 11/1996 | Germany . |

Primary Examiner—William A. Cuchlinski, Jr.
Assistant Examiner—Olga Hernandez
Attorney, Agent, or Firm—Foley & Lardner

[57] ABSTRACT

A speed change ratio of a continuously variable transmission comprising a V-belt looped around a pair of variable pulleys for varying the speed change ratio according to a first and second oil pressures. A speed change control valve converts a first oil pressure from an oil pressure supply unit to a second oil pressure based on a speed change ratio command value. The speed change ratio command value is calculated by a microprocessor according to a real speed change ratio and dynamic characteristics of the transmission. By calculating the dynamic characteristics according to the real speed change ratio and the first oil pressure, a set response of the transmission is always obtained regardless of fluctuations of the first oil pressure.

8 Claims, 10 Drawing Sheets

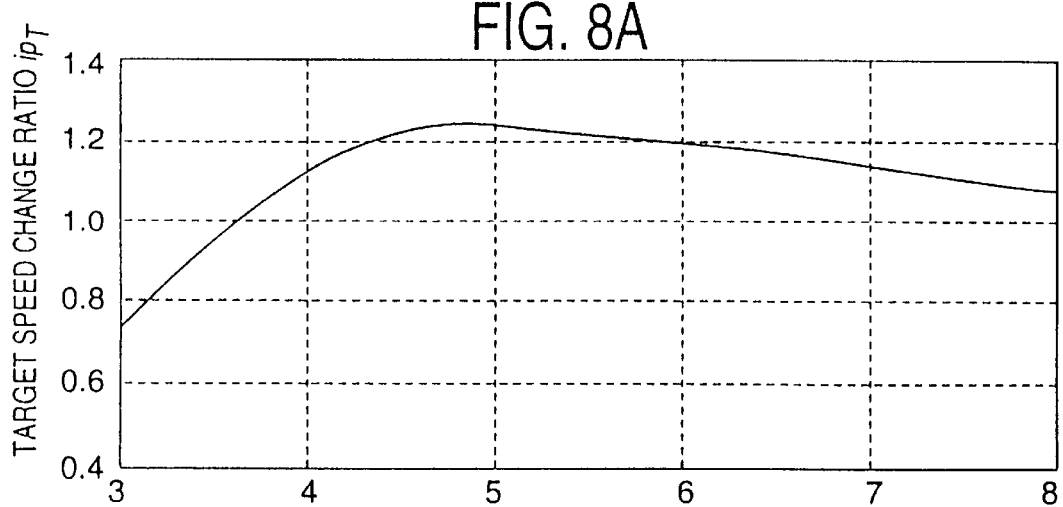
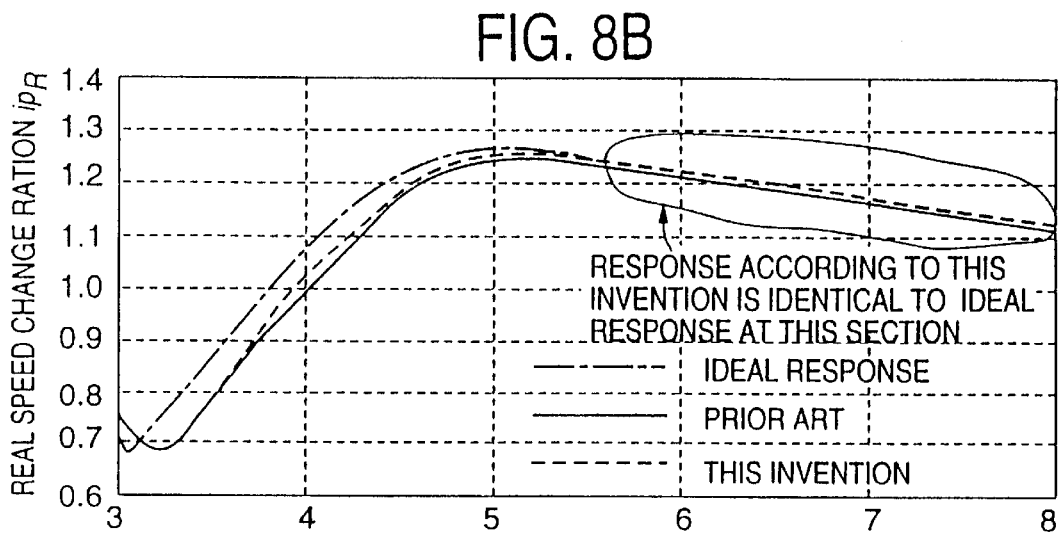
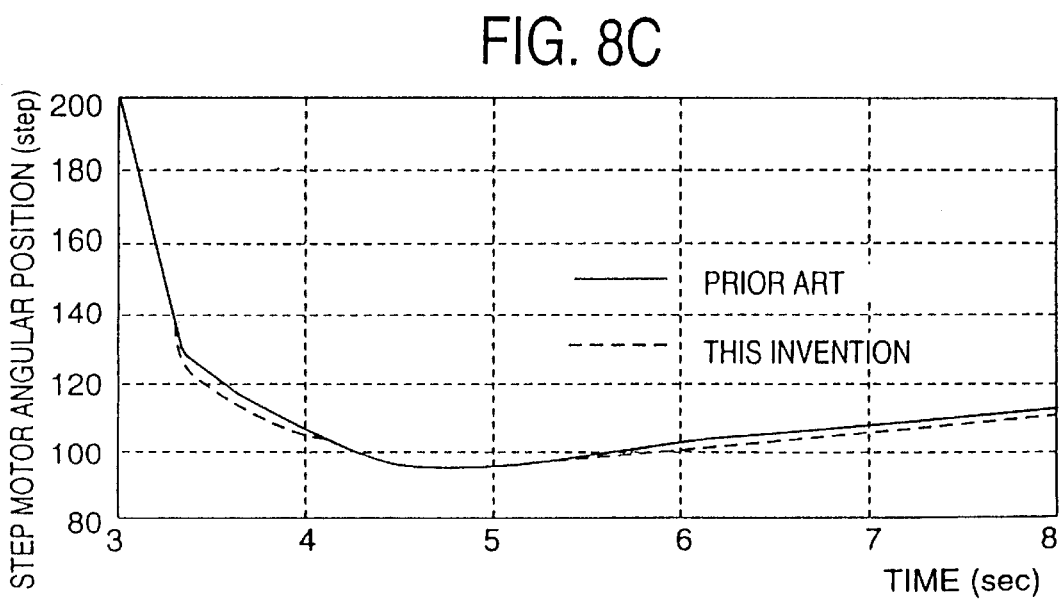

SPEED CHANGE RATIO CONTROLLER FOR CONTINUOUSLY VARIABLE TRANSMISSION

FIELD OF THE INVENTION

This invention relates to speed change ratio control of a continuously variable transmission for a vehicle.

BACKGROUND OF THE INVENTION

One type of continuously variable transmission for continually varying a speed change ratio of a vehicle is a V-belt type transmission disclosed for example in Tokkai Hei 8-338515 published by the Japanese Patent Office in 1996.

The V-belt is looped around a drive pulley and driven pulley respectively comprising a groove, and the contact radius between the belt and a pulley is made to vary by changing the groove width of the pulleys so as to vary the rotation ratio of these pulleys.

The groove width of each pulley changes according to an oil pressure supplied to an oil chamber of each pulley. A line pressure supplied from an oil pump driven by an engine is constantly supplied to the oil chamber of the driven pulley, and an oil pressure which is the line pressure decompressed via an oil pressure control valve is supplied to the drive pulley. The oil pressure control valve is a spool valve, and the pressure of the oil chamber of the primary pulley is controlled by connecting an oil pump and oil tank selectively to the oil chamber of the drive pulley according to a position change of the spool.

The spool is connected to a step motor and drive pulley via a link, the spool position being made to vary according to a rotation position of the step motor. At the same time, the variation of drive pulley groove width is fed back to the spool position via the link. As a result, the spool stops in a position where a command value represented by the rotation position of the step motor and a real speed change ratio represented by the pulley groove width are balanced.

A controller controlling the speed change ratio is so designed that a desirable speed change response is obtained at a predetermined line pressure based on dynamic characteristics of the transmission.

However, the line pressure is often set according to a value representing the engine drive torque, e.g. the throttle opening. This is due to the reason that, If the line pressure is always kept constant, the load on the engine becomes large, and fuel consumption increases.

When the line pressure changes, the dynamic characteristics of the speed change mechanism also change, and the desired speed change is no longer obtained. As a result, it takes a long time until a target speed change ratio set by the controller coincides with the real speed change ratio.

SUMMARY OF THE INVENTION

It is therefore an object of this invention to obtain preset response characteristics regardless of fluctuation of line pressure.

It is a further object of this invention to eliminate the effect of parameter fluctuation and disturbance due to manufacturing errors in a transmission on speed change response.

In order to achieve the above objects, this invention provides a speed change ratio controller for such a continuously variable transmission of a vehicle that has a V-belt looped around a pair of variable pulleys. The pulleys varies a radius of a contact part with the V-belt according to a first oil pressure supporting anyone of the pulleys and a second oil pressure supporting the other of the pulleys.

The controller comprises a sensor for detecting a running state of a vehicle, a sensor for detecting a real speed change ratio of the transmission, an oil pressure supply unit for generating the first oil pressure, this first oil pressure varying according to the running state of the vehicle, a speed change control valve for adjusting the first oil pressure to the second pressure according to a speed change ratio command value, and a microprocessor.

The microprocessor is programmed to set a target speed change ratio from the running state of the vehicle, calculate the first oil pressure based on the running state of the vehicle, estimate a dynamic characteristic of the transmission according to the real speed change ratio of the transmission, modify the dynamic characteristic of the transmission according to the first oil pressure, and compute the speed change ratio command value based on the target speed change ratio and a modified dynamic characteristic.

It is preferable that the running state detecting sensor comprises a sensor for detecting a throttle opening of the engine, the oil pressure supply unit comprises a line pressure control valve for controlling a pressure of the oil pressure supply unit to the first oil pressure based on a pressure command signal calculated from the throttle opening of the engine, and the microprocessor is further programmed to calculate the first oil pressure based on the pressure command signal and a dynamic characteristic of the line pressure control valve.

It is also preferable that the microprocessor is further programmed to calculate a first external disturbance compensating value from a predetermined time constant and the speed change ratio command value, a second external disturbance compensating value from the time constant and the real speed change ratio, calculate an output value by subtracting the first external disturbance compensating value from the second external disturbance compensating value, and correct the speed change ratio command value by subtracting the output value from the speed change ratio command value.

It is further preferable that the microprocessor calculates the output value by the following equation:

$$ip_D(t) = \frac{T_H \cdot s + 1}{Tp \cdot s + 1} \cdot ip_R(t) - \frac{ip(t)}{T_H \cdot s + 1} \cdot \exp(-L \cdot s)$$

where, $ip_D$ = output value, $\dfrac{T_H \cdot s + 1}{Tp \cdot s + 1} \cdot ip_R(t)$ = second external disturbance compensating value, $\dfrac{ip(t)}{T_H \cdot s + 1} \cdot \exp(-L \cdot s)$ = first external disturbance compensating value, $ip_R$=real speed change ratio,
ip=speed change ratio command value,
$T_H$=lowpass filter time constant,
Tp=time constant of continuously variable transmission,
s=Laplacian operator,
L=dead time.

It is also preferable that the microprocessor is further programmed to determine a speed change direction of the transmission, and estimate different dynamic characteristics of the transmission according to the speed change direction.

If the speed change control valve is driven by a step motor which varies an angular position according to a signal from the microprocessor, it is preferable that the microprocessor is further programmed to convert the speed change ratio command value to the signal so that the speed change ratio command value and the real speed change ratio are in linear proportion.

In this case, it is further preferable that the microprocessor converts the speed change ratio command value to the signal based on a relation between a drive pulley groove width Ds and the speed change ratio ip obtained from the following equations (a), (b), (c):

$$r_1 = \frac{D_S}{2 \cdot \tan\beta} + r_{10} \tag{a}$$

$$r_0 = \frac{2 \cdot r_1 - \pi \cdot Dc + \sqrt{(2 \cdot r_1 - \pi \cdot Dc)^2 - 4 \cdot \{r_1^2 + \pi \cdot Dc \cdot r_1 + Dc \cdot (2 \cdot Dc - L \cdot s)\}}}{2} \tag{b}$$

$$ip = \frac{r_0}{r_1} \tag{c}$$

where, $r_1$=radius of belt contact part of drive pulley, $r_{10}$=minimum radius of belt contact part of drive pulley, $r_0$=radius of belt contact part of driven pulley, Ds=variation amount of groove width of drive pulley from the value corresponding to minimum radius of belt contact part of drive pulley, Dc=distance between drive pulley and driven pulley.

$L_B$=belt circumference, $\beta$=sheave angle of drive pulley.

The details as well as other features and advantages of this invention are set forth in the remainder of the specification and are shown in the accompanying drawings.

BRIEF DESCRIPTION OF THE DRAWINGS

FIGS. 8A–8C are diagrams which compare a change of a target speed change ratio $ip_T$, real speed change ratio $ip_R$ and step motor angular position command value $\theta r$ in kickdown operation, according to the speed change ratio controller, with a prior art device.

DESCRIPTION OF THE PREFERRED EMBODIMENTS

Figure 1:
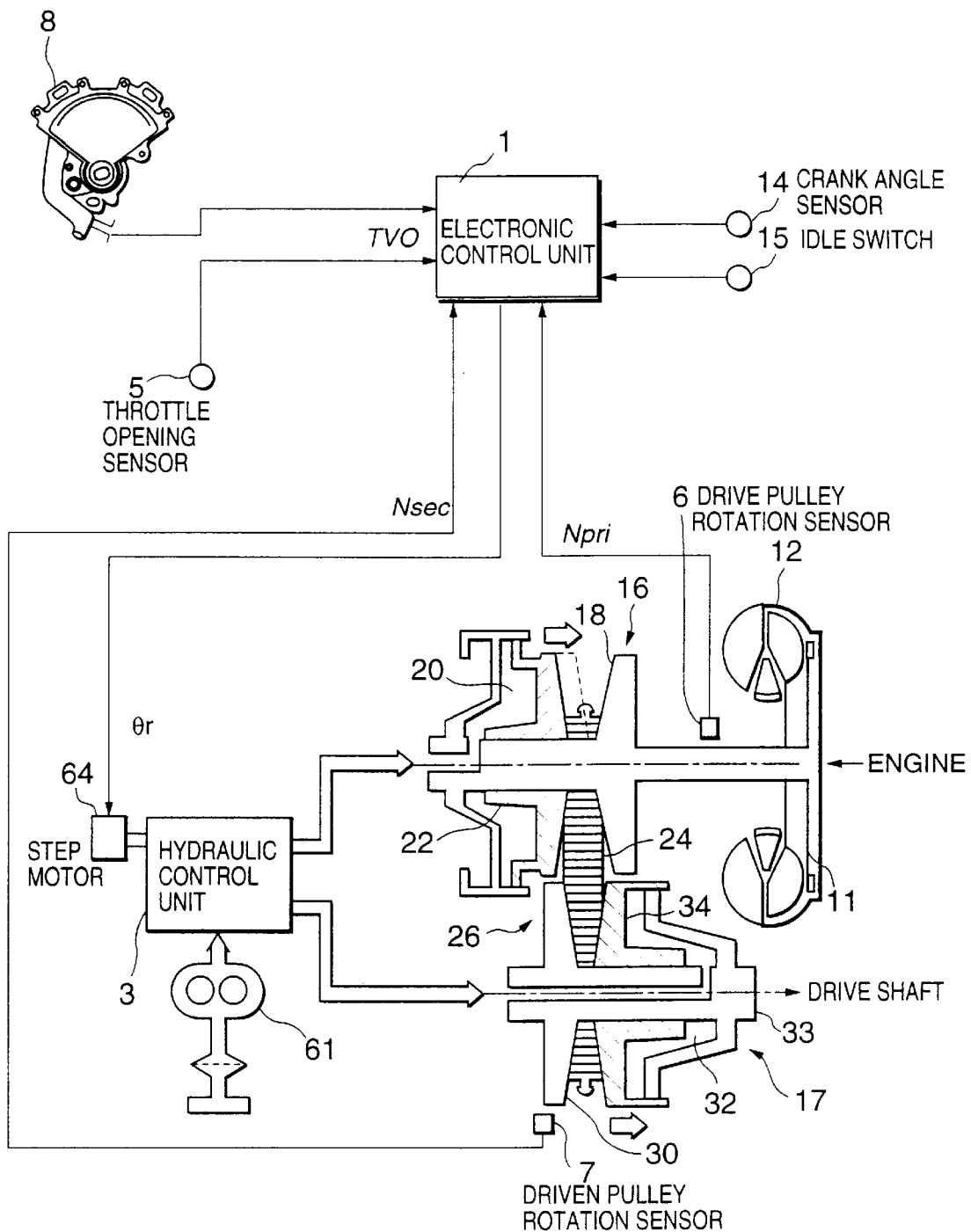
FIG. 1 is a schematic diagram of a speed change ratio controller according to this invention.

Referring to FIG. 1 of the drawings, a continuously variable transmission (CVT) 17 is connected to an engine, not illustrated, via a torque converter 12 comprising a lock up clutch 11. The CVT 17 comprises a drive pulley 16 which is connected to a torque-converter 12, and a driven pulley 26 which is connected to an output shaft 33. A V-belt 24 is looped around these pulleys 16 and 26.

The drive pulley 16 comprises a fixed conical plate 18 which rotates together with the torque-converter 12 and a movable conical plate 22 facing the fixed conical plate 18, a V-shaped pulley groove being formed between these conical plates 18 and 22. The movable conical plate 22 is displaced according to an oil pressure supplied to a drive pulley cylinder chamber 20, i.e. the drive pulley oil pressure, in the direction of the pulley shaft.

The driven pulley 26 comprises the fixed conical plate 30 which rotates together with a pulley shaft 33, and a movable conical plate 34 arranged facing the fixed conical plate 30, a V-shaped pulley groove being formed between these conical plates 30 and 34. The movable conical plate 34 is displaced according to a line pressure supplied to a driven pulley cylinder chamber 32, i.e. according to a driven pulley pressure, in the direction of the pulley shaft. The movable conical plate 34 has a larger pressure-receiving area than the movable conical plate 22.

A drive torque input from an engine is input to the drive pulley 16 of the CVI 17 via the torque-converter 12, and is transmitted to the driven pulley 26 via the V-belt 24 from the drive pulley 16.

When the movable conical plate 22 of the drive pulley 16 and the movable conical plate 34 of the driven pulley 26 are respectively displaced in the shaft direction, the contact radii between the V belt 24 and each pulley change, and a rotation speed ratio between the drive pulley 16 and driven pulley 26, i.e. a speed change ratio, can therefore be changed.

For example, if the width of the V-shaped groove of the drive pulley 16 is reduced, the contact radius between the drive pulley 16 and V-belt 24 becomes large, and the rotation speed of the output shaft increases. Conversely, if the width of the V-shaped groove of the drive pulley 16 is increased, the contact radius between the drive pulley 16 and V-belt 24 becomes small, and the rotation speed of the output shaft drops.

The speed change ratio of the CVT 17 and a contact frictional force between the V-belt 24 and conical plates are controlled by an oil pressure control unit 3.

Figure 2:
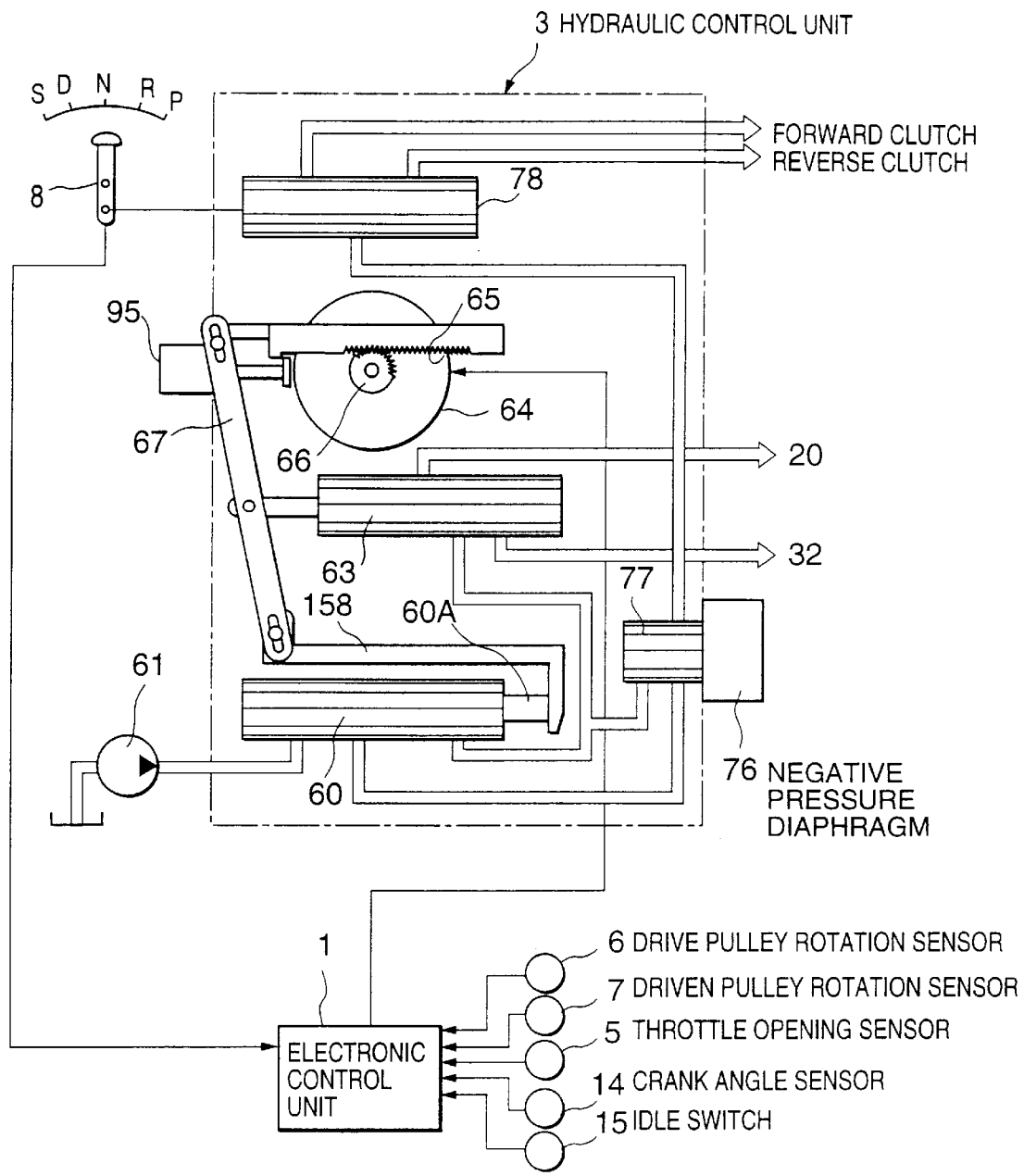
FIG. 2 is a schematic *diagram of an oil pressure control unit according to this invention.

The oil pressure control unit 3, as shown in FIG. 2, is provided with a speed control valve 63 of the spool type, a step motor 64 which displaces the spool of the speed control valve 63 according to a target speed change ratio calculated by an electronic control unit 1 and a line pressure control-valve 60 for controlling a line pressure introduced from an oil pump 61.

The line pressure control valve 60 adjusts line pressure according to a pilot pressure supplied from a spool valve 77 in response to a negative pressure diaphragm 76 which detects an intake negative pressure of the engine.

The line pressure adjusted by the line pressure control valve 60 is supplied to the speed change control valve 63, and line pressure is also supplied to the spool valve 77 as a source of pilot pressure generated by the spool valve 77. The pilot pressure of the spool valve 77 is supplied as a forward/reverse clutch tightening pressure of a clutch via a manual valve 78 in response to a shift lever.

The structure of this line pressure control is known for example from Tokkai Hei 2-240438 published by the Japanese Patent Office in 1990.

A rotation speed signal from a drive pulley rotation speed sensor 6 which detects a rotation speed Npri of the drive pulley 16 of CVT 17, i.e. the input rotation speed to the CVT 17, and a rotation speed signal Nsec of the driven pulley 26, i.e. a rotation speed signal from a driven pulley rotation speed sensor 7 which detects the output rotation speed of the CVT 17, are input to the electronic control unit 1. The rotation speed signal from the driven pulley 26 is also used as a vehicle speed VSP.

Also input are signals showing the drive state of the vehicle, i.e. a shift position signal from an inhibitor switch 8 for detecting the shift position of a shift lever, a throttle opening signal TVO from a throttle opening sensor 5 according to a driver's accelerator pedal depression amount, a rotation speed signal Ne of the engine from a crank angle sensor 14, and an idle signal from an idle switch 15. A sensor detecting the accelerator depression amount directly can also be used instead of the throttle opening sensor 5.

Based on these signals, the electronic control unit 1 controls a speed change ratio according to the drive state and the driver's needs.

The control of speed change ratio is performed by controlling the oil pressure supplied to the drive pulley cylinder chamber 20. When the oil pressure supplied to the drive pulley cylinder chamber 20 rises, the speed change ratio varies in the direction in which the output rotation increases, and when this oil pressure drops, the speed change ratio varies in the direction in which the output rotation decreases. This control is performed by a signal output to the step motor 64 which drives the speed control valve 63 of the oil pressure control unit 3 from the control unit 1. The oil pressure of a cylinder chamber 32 of the driven pulley 26 is also supplied through the control valve 63, but this oil pressure is always maintained equal to the line pressure.

The step motor 64 displaces the spool of the speed change control valve 63 via a pinion 66, rack 65 and speed change link 67 according to an angular position command value θr from the electronic control unit 1. Displacement of the speed change link 67 is limited to a fixed range by a stopper 95. The spool selectively connects line pressure supplied from the line pressure control valve 60 or a drain to the pulley cylinder chamber 20 according to this displacement position. A rod 60A, which moves in synchronism with the spool of the line pressure control-valve 60, is joined to one end of the speed change link 67 via a feedback member 158. Due to this, line pressure is fed back to the spool position of the speed change control valve 3. The position of the movable conical plate 34 of the driven pulley 26 varies with the line pressure, so feeding back of the line pressure means feeding back the position of the movable conical plate 34 to the speed change control valve 63.

The speed change control valve 63 increases supply oil pressure to the cylinder chamber 20 of drive pulley 16 by displacing the rack 65 to the left of FIG. 2, and the CVT output speed is thereby varied towards higher speed. The oil pressure of the cylinder chamber 20 is reduced by displacement to the right of the figure so as to vary the CVT output speed towards lower speed.

Figure 5:
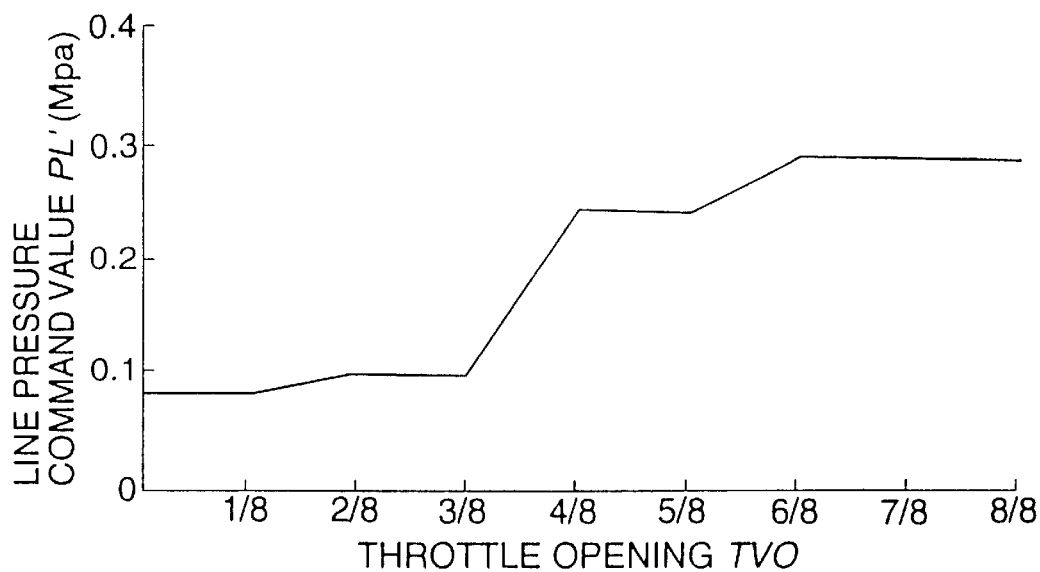
FIG. 5 is a graph showing a relation between a line pressure command value PL' and throttle opening TVO.

The control characteristics of line pressure PL due to the line pressure control valve 60 are shown in FIG. 5. Instead of the throttle valve 77 which responds to the negative pressure diaphragm 76, the line pressure control valve 60 may be driven according to the accelerator pedal depression amount or throttle opening.

The structure of the speed change control valve 63 and the feedback of line pressure to the speed change control valve 63 are known from the aforementioned Tokkai Hei 2-240438.

Next, the speed change ratio control performed by the electronic control unit 1 will be described referring to the block diagram of FIG. 3 and the flowchart of FIG. 4.

Figure 3:
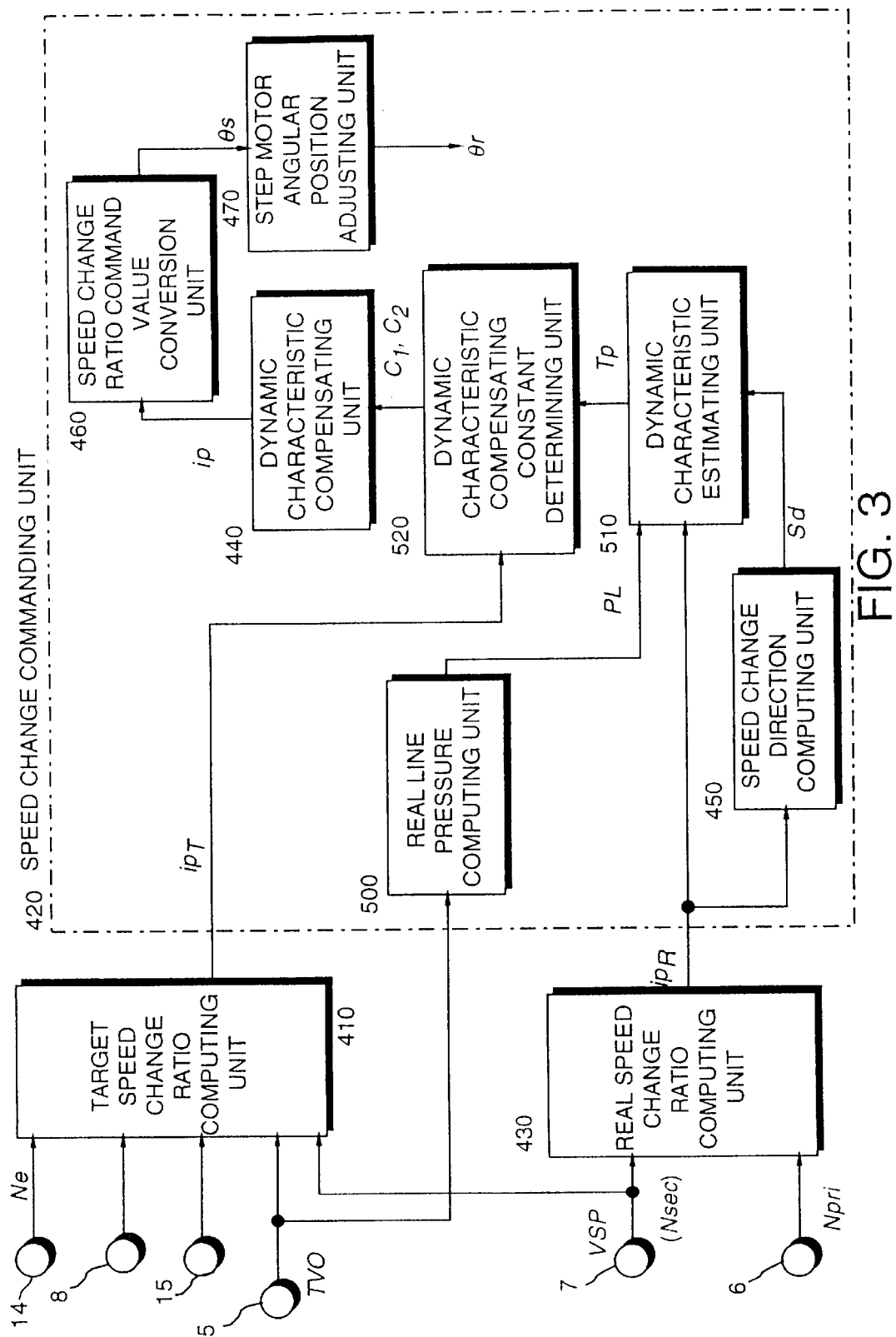
FIG. 3 is a block diagram of an electronic control unit according to this invention.
Figure 4:
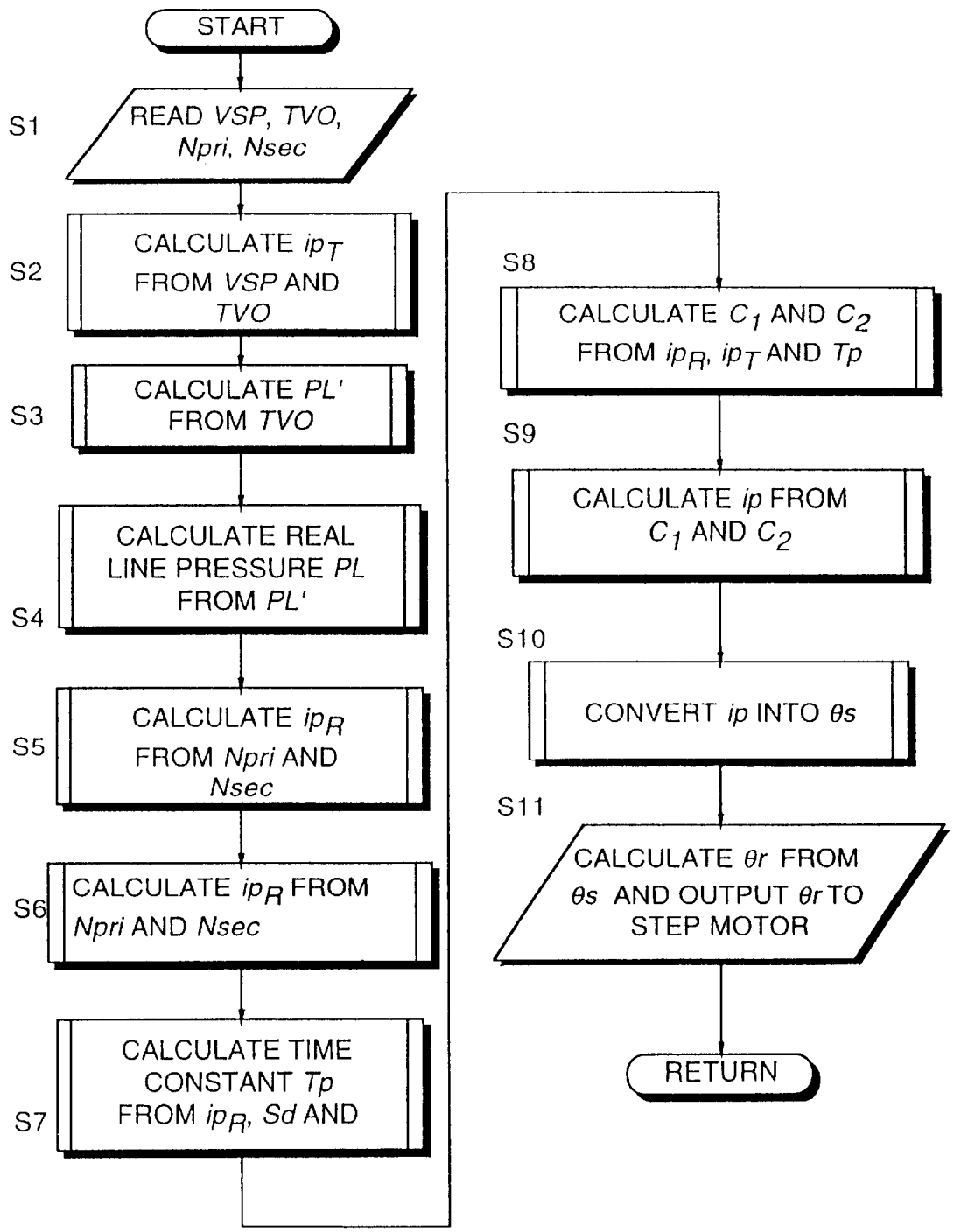
FIG. 4 is a flowchart for describing a speed change ratio control process performed by the electronic control unit.

The electronic control unit 1 comprises a microcomputer, and is provided with a target speed change ratio computing unit 410, real speed change ratio computing unit 430 and speed change commanding unit 420 as shown in the block diagram of FIG. 3.

The target speed change ratio computing unit 410 estimates the running state of the vehicle and calculates a target speed change ratio $ip_T$ based on the vehicle speed VSP, engine rotation speed Ne, throttle opening TVO, shift position signal from the inhibitor switch 8 and signal from the idle switch 15. This calculation is performed by referring to a map which sets the target engine rotation speed according to the throttle opening TVO and vehicle speed VSP. This process is disclosed for example in Tokkai Sho 59-217047 published by the Japanese Patent Office in 1984.

The real speed change ratio computing unit 430 calculates a real speed change ratio $ip_R$ from the vehicle speed VSP and drive pulley rotation speed Npri.

The speed change commanding unit 420 is provided with a speed change direction computing unit 450, real line pressure computing unit 500, dynamic characteristic estimating unit 510, dynamic characteristic compensating constant determining unit 520, dynamic characteristic compensating unit 440, speed change ratio command value conversion unit 460 and step motor angular position adjusting unit 470.

The speed change direction computing unit 450 computes a connection direction value Sd of the speed change control valve 63 from the real speed change ratio $ip_R$ and angular position command value θr of the step motor 64. The connection direction value Sd specifies whether to connect the primary cylinder chamber 20 to line pressure or to the drain. When line pressure is connected, the speed change ratio changes in the speed increase direction, and when the drain is connected, the speed change ratio changes in the speed decrease direction.

The real line pressure computing unit 500 computes a real line pressure PL set by the line pressure control valve 60 based on the throttle opening TVO. First, a line pressure command value PL' is computed by the following equation (1) and a map shown in FIG. 5.

$$PL'=fp(TVO) \qquad (1)$$

Next, considering the dynamic characteristics of the line pressure control-valve 60, the real line pressure PL is computed by the following equation (2).

$$PL = \frac{1}{T_{PL} \cdot s + 1} \cdot PL' \qquad (2)$$

where, $T_{PL}$=time constant of line pressure control valve 60, s=Laplacian operator.

Instead of performing the above calculation, the line pressure PL may be detected directly by pressure sensors.

The speed change commanding unit 420 corrects the speed change ratio command value using the dynamic characteristic compensating unit 440 based on the aforesaid target speed change ratio $ip_T$, real speed change ratio $ip_R$, connection direction value Sd, and line pressure PL. In this way, the angular position command value θr of the step motor 64 is computed while compensating the fluctuation of line pressure so as to achieve the target speed change ratio $ip_T$ for predetermined response characteristics.

The dynamic characteristic $G_p(s)$ of the CVT 17 can be represented by the following equation using first-order delay and dead-time (3).

$$G_p(s) = \frac{k_p \cdot (i_{pR})}{Tp(i_{pR}, PL, Sd) \cdot s + 1} \cdot \exp(-Ls) \qquad (3)$$

where, $k_p^*(ip_R)$=gain of CVT 17 to correct for the fact that the step motor angular position and speed change ratio are not in direct proportion, $Tp(ip_R, PL, Sd)$=time constant of CVT 17, L=dead time of CVT 17, and s=Laplacian operator.

Figure 6:
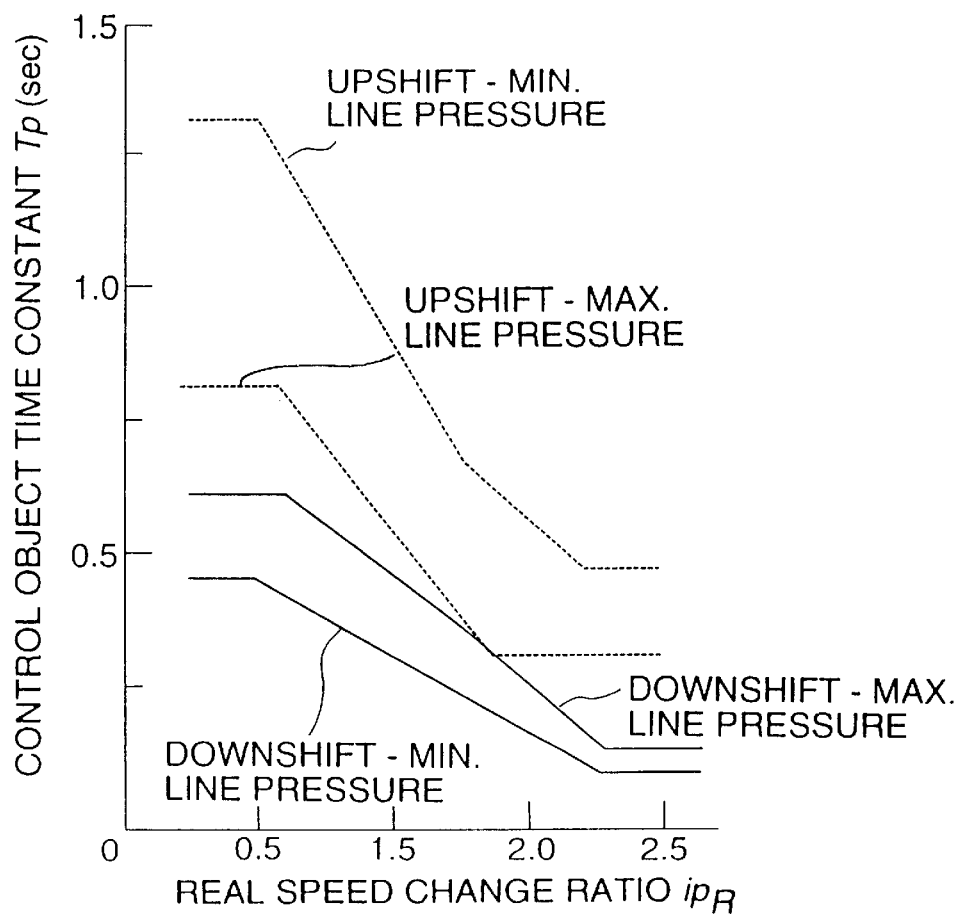
FIG. 6 is a map specifying a relation between a speed change ratio and time constant Tp stored by the electronic control unit.

This dynamic characteristic $G_p(s)$ is found by beforehand, and is stored as a time constant map shown in FIG. 6 by the electronic control unit 1. The dynamic characteristic estimating unit 510 finds the time constant Tp of the CVT 17 from the real speed change ratio $ip_R$, connection direction value Sd and line pressure PL by referring to this time constant map. This process is expressed by the following equation (4).

$$Tp = TP_{map}(i_{pR}, PL, Sd) \qquad (4)$$

In this map, the time constant Tp is set for the maximum and minimum line pressure during shift-up and the maximum and minimum line pressure during shift-down of each speed ratio. Therefore, the time constant Tp according to the speed change ratio $ip_R$ may be obtained with the line pressure PL and connection direction value Sd as parameters.

The dynamic characteristic compensating constant determining unit 520 computes an output value $ip_A$ so that the real speed change ratio $ip_R$ follows the target speed change ratio $ip_T$ under a desired speed change response characteristic $G_T(s)$. The desired speed change response characteristic $G_T(s)$ is specified by the following equation (5).

$$G_T(s) = \frac{1}{T_T \cdot s + 1} \cdot \exp(-L \cdot s) \qquad (5)$$

where, $T_T$=preset response time constant.

First, the dynamic characteristic compensating constant determining unit 520 computes an open loop output value $ip_{AF}$ by the following equation (6):

$$ip_{AF}(t) = \frac{T_{FB} \cdot s + 1}{T_T \cdot s + 1} \cdot ip_T(t) \qquad (6)$$

where, $T_{FB}$=target response time constant.

Also, the dynamic characteristic compensating constant determining unit 520 computes dynamic characteristic compensating constants $C_1$, $C_2$ from the open loop output value $ip_{AF}$ and real speed change ratio $ip_R$ by the following equations (7), (8).

$$C_1 = \frac{Tp}{T_{FB}} \qquad (7)$$

$$C_2 = \frac{Tp}{T_{FB}} - 1 \qquad (8)$$

The dynamic characteristic compensating unit 440 sets a speed change ratio command value ip by the following equation (9).

$$ip = ip_A = C_1 \cdot ip_{AF} - C_2 \cdot ip_R \qquad (9)$$

In this way, the speed change ratio command value ip output from the dynamic characteristic compensating unit 440 compensates for the dynamic characteristic change of the CVT 17 according to a difference of the real speed change ratio $ip_R$, line pressure PL and connection direction Sd, and a predetermined response is always achieved.

The speed change ratio command value conversion unit 460 converts the speed change ratio command value ip obtained by the dynamic characteristic compensating unit 440 into a step motor angular position command value θs. The step motor angular position command value θs corresponds to a stroke amount of the spool 63 of the speed change control valve 63.

The step motor angular position adjusting unit 470 regulates the maximum speed according to the response characteristics of the step motor 64 so as to make the step motor angular position command value θs and the real angular position θ of the step motor 64 coincide, and the angular position command value θr is output on the basis of this regulation.

Figure 7:
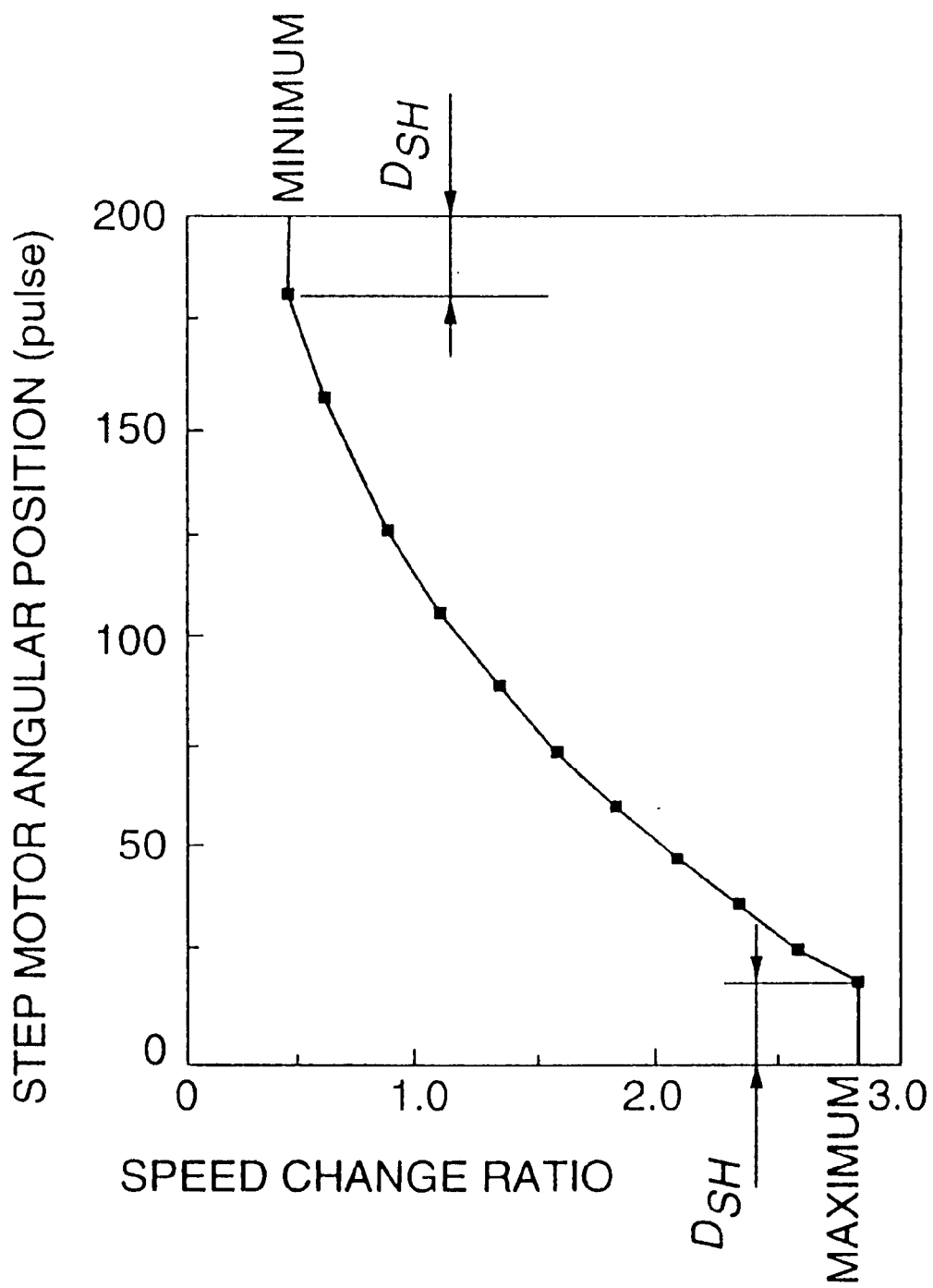
FIG. 7 is a map specifying a relation between a speed change ratio ip and step motor angular position $\theta$ stored by the electronic control unit.

The relation between the speed change ratio ip and step motor angular position θ is shown in FIG. 7. $D_{SH}$ in the figure shows an ineffectual angular position change amount of the step motor 64 until the rack 65 begins to move from a state wherein displacement is regulated by the stopper 95. Within a range specified by the ineffectual angular position change amount $D_{SH}$, the rack 65 is not displaced regardless of the rotation displacement of the step motor 64.

A groove interval Ds of the drive pulley 16 corresponding to an effective angular position of the step motor 64 after eliminating the ineffectual angular position change amount $D_{SH}$, and relations between the speed change ratio ip and values pertaining to the drive pulley 16 and driven pulley 26, are expressed by the following equations (10)–(12).

$$r_1 = \frac{D_S}{2 \cdot \tan\beta} + r_{10} \qquad (10)$$

$$r_0 = \frac{2 \cdot r_1 - \pi \cdot Dc + \sqrt{(2 \cdot r_1 - \pi \cdot Dc)^2 - 4 \cdot \{r_1^2 + \pi \cdot Dc \cdot r_1 + Dc \cdot (2 \cdot Dc - L \cdot s)\}}}{2} \qquad (11)$$

$$ip = \frac{r_0}{r_1} \qquad (12)$$

where, $r_1$=radius of belt contact part of drive pulley, $r_{10}$=minimum radius of drive pulley, $r_0$=radius of belt contact part of driven pulley, Ds=variation amount from minimum radius equivalent value of groove width of drive pulley (=angular position of step motor), Dc=distance between drive pulley and driven pulley, $L_B$=circumferential length of belt, β=groove angle of primary pulley.

Next, the aforesaid speed change ratio control performed by the electronic control unit 1 will be described referring to the flowchart of FIG. 4. This flowchart is repeatedly performed at a predetermined interval according for example to a timer interrupt.

First, in a step S1, the drive pulley rotation speed Npri and driven pulley rotation speed Nsec(=vehicle speed VSP). and the throttle opening TVO according to a driver operation, are read.

In a step S2, the target speed change ratio $ip_T$ is looked up from a preset map according to the throttle opening TVO as a parameter.

In a step S3, based on the map of FIG. 5, the line pressure command value PL' is computed according to the throttle opening TVO.

In a step S4, the real line pressure PL in due consideration of the dynamic characteristics of the line pressure control valve 60 is computed by the aforesaid equation (2).

In a step S5, the real speed change ratio $ip_R$ is computed from the vehicle speed VSP and drive pulley rotation speed Npri. In a step S6, the connection direction value Sd of the speed change control valve 63, i.e. the speed change direction, is computed from the real speed change ratio $ip_R$ and angular position command value θr of the step motor 64.

In a step S7, the time constant Tp is computed from the preset controlled time constant map of FIG. 6 based on the real speed change ratio $ip_R$, connection direction value Sd and real line pressure PL.

In a step S8, the dynamic characteristic compensating constants $C_1$, $C_2$ are computed from the target speed change ratio $ip_T$, real speed change ratio $ip_R$ and time constant Tp.

In a step S9, the output value $ip_A$ is calculated from the dynamic characteristic compensating constants $C_1$, $C_2$, and this is output as the speed change ratio command value ip.

The speed change ratio command value ip is converted into the step motor angular position command value θs in a step S10.

In a step S11, the maximum step motor rotation speed is regulated according to the response characteristics of the step motor 64 so as to make the step motor angular position command value θs coincide with the real angular position θ of the step motor 64. The value after regulation is output to the step motor 64 as the angular position command value θr.

The step S2 of the above-mentioned process corresponds to the target speed change ratio computing unit 410, the steps S3 and S4 correspond to the real line pressure computing unit 500, the step S5 corresponds to the real speed change ratio computing unit 430, the step S6 corresponds to the speed change direction computing unit 450, the step S7 corresponds to the dynamic characteristic estimating unit 510, the step S8 corresponds to the dynamic characteristic compensating constant determining unit 520, the step S9 corresponds to the dynamic characteristic compensating unit 440, the step S10 corresponds to the speed change ratio command value conversion unit 40, and the step S11 corresponds to the step motor angular position adjusting unit 470.

Now, an example wherein a kick down operation, i.e., shift down operation of the transmission when the accelerator pedal is depressed, is explained in order to assess how the above control works.

The line pressure PL varies according to the throttle opening TVO as shown in FIG. 5. In kick down operation, the speed change ratio $ip_T$ and $ip_R$ vary so as to reduce the output rotation speed, i.e. in the direction in which the speed change ratio increases. When the driver depresses the accelerator pedal, the line pressure PL also suddenly increases.

Due to kick down, after the target speed change ratio $ip_T$ has rapidly increased, it gradually decreases according to increase of the vehicle speed VSP as shown in FIG. 8A.

At that time, the line pressure PL also increases according to the increase of the throttle opening TVO. Therefore in the early stage of kick down, the time constant Tp of CVT 17 varies from characteristics corresponding to a downshift minimum line pressure shown by the solid line in FIG. 6 or characteristics near to them to characteristics corresponding to a maximum line pressure or characteristics near to them.

In the latter stage of kick down when the target speed change ratio $ip_T$ is gradually varying in the decrease direction, the time constant Tp changes to upshift characteristics as shown by the broken lines in FIG. 6. In this case also, the characteristic of the time constant Tp varies with an arbitrary width between the maximum line pressure and minimum line pressure according to the variation of line pressure PL. In this way, by making the time constant Tp showing the dynamic characteristics of the CVT 17 vary according to the real speed change ratio $ip_R$, connection direction value Sd and line pressure PL, the real speed change ratio $ip_R$ shown by the broken line of FIG. 8B has characteristics closer to the ideal response curve shown by the dot-and-dash line in the figure, i.e. the design characteristics, than the prior art example shown by the solid line in the figure.

In particular during the latter stage of kick down when the speed change ratio is gradually decreasing, the real speed change ratio $ip_R$ coincides with the ideal response curve, and as the desired response characteristic is obtained regardless of variation of line pressure PL, highly precise speed change ratio control can be performed.

Due to the above-mentioned kick down operation, the angular position θr of the step motor changes as shown in FIG. 8C.

Figure 9A:
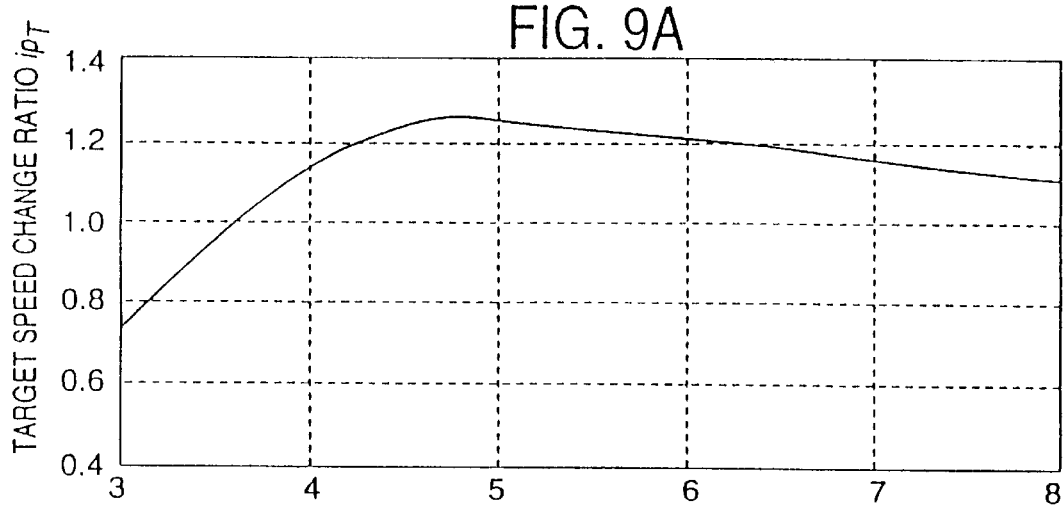
FIGS. 9A–9C are similar to FIGS. 8A–8C, but showing a case where the setting of the time constant Tp has been changed.
Figure 9B:
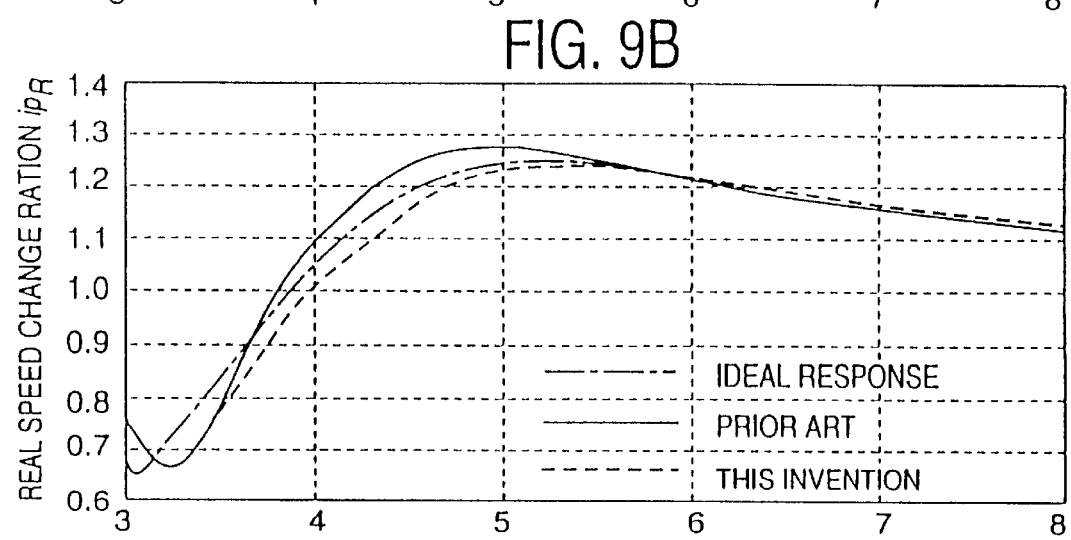
Figure 9C:
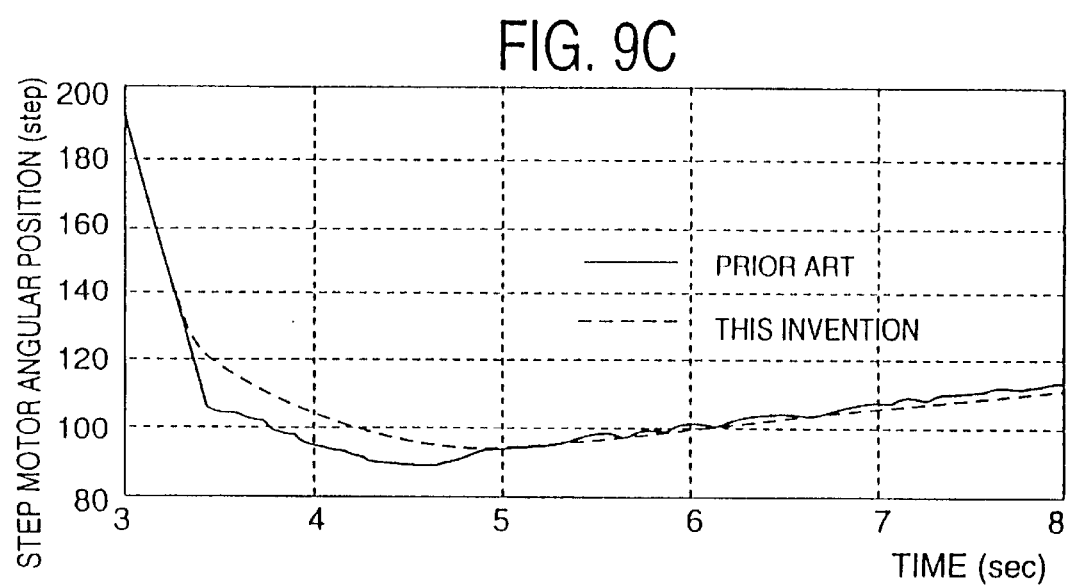

FIGS. 9A–9C show a speed change ratio and change of step motor angular position when the characteristics of the time constant Tp are set for a line pressure lower than that of the aforesaid case of FIGS. 8A–8C.

In this setting, the real speed change ratio $ip_R$ has characteristics closer to the ideal response compared to the aforesaid prior art example.

Figure 10:
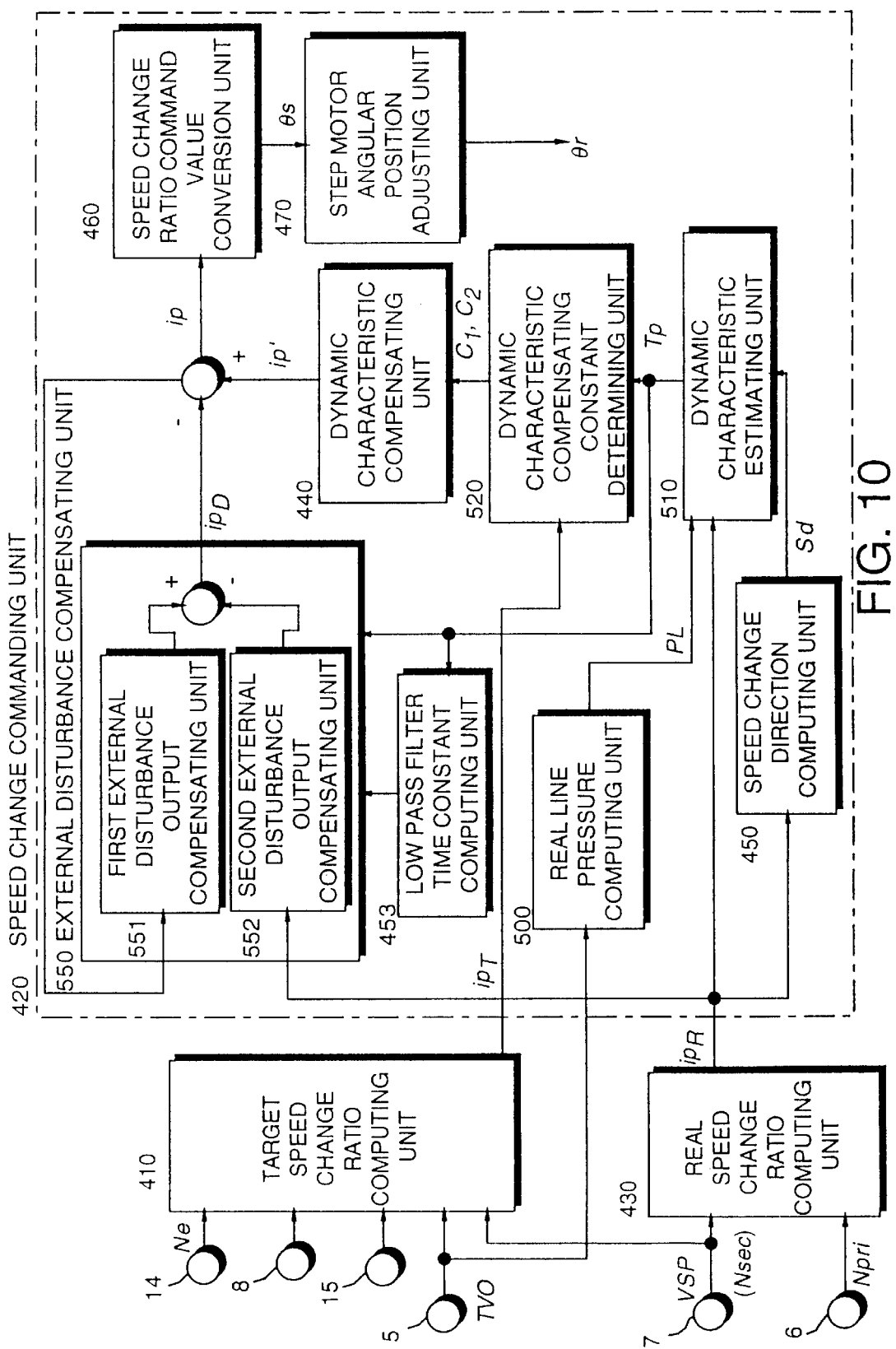
FIG. 10 is a block diagram of an electronic control unit according to a second embodiment of this invention.
Figure 11:
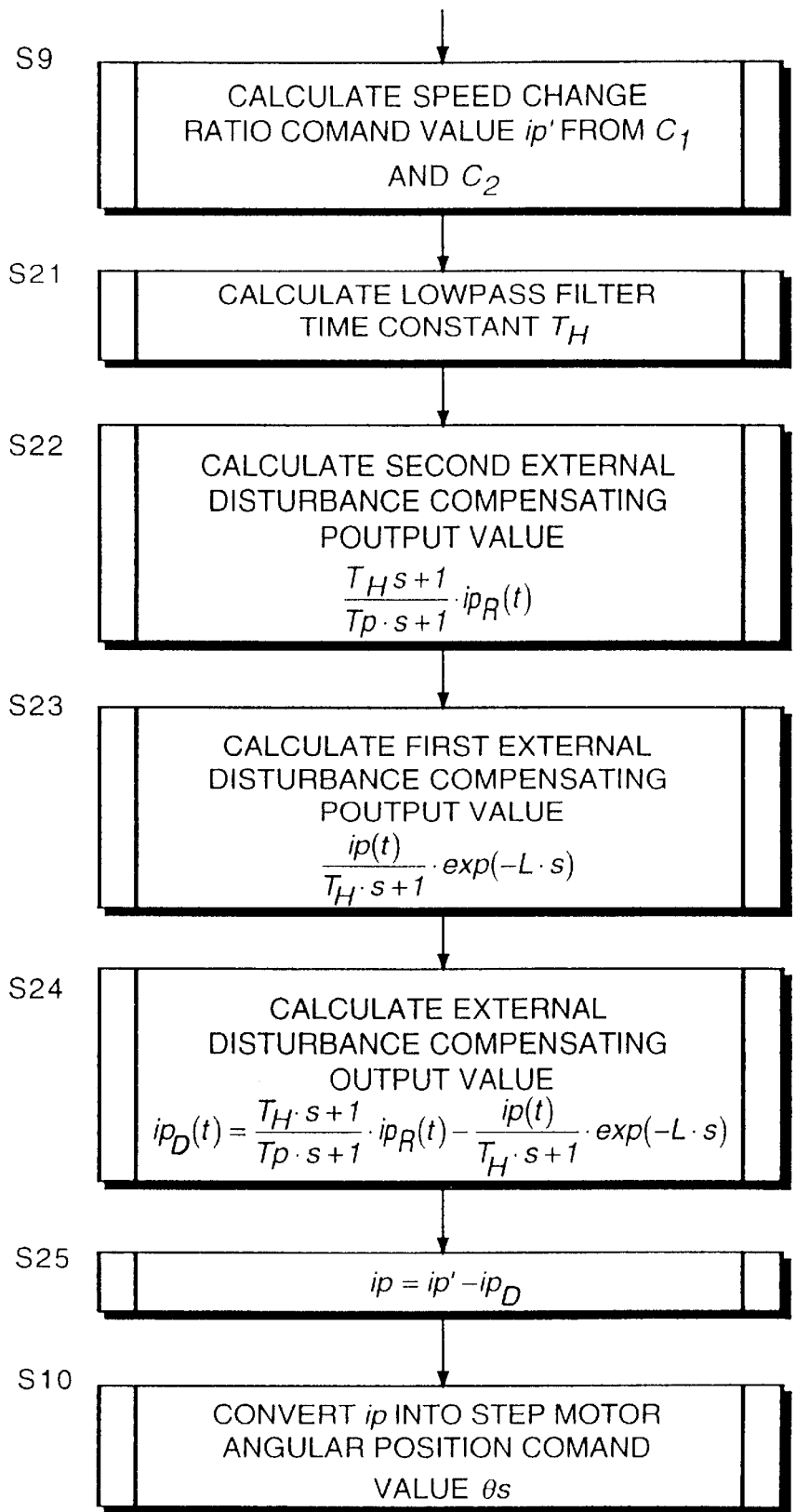
FIG. 11 is a flowchart for describing a speed change ratio control process performed by the electronic control unit according to the second embodiment.

FIGS. 10 and 11 show a second embodiment of this invention.

According to this embodiment the speed change command unit 420 of the aforesaid first embodiment is provided with an external disturbance compensating unit 550 comprising a first external disturbance output compensating unit 551 and a second external disturbance output compensating unit 552 as shown in FIG. 10. It is also provided with a low pass filter time constant computing unit 453 which computes the time constant of the low pass filter of the external disturbance compensating unit 550 based on the time constant Tp of the controlled CVT 17. The first external disturbance output compensating unit 551 and the second external disturbance output compensating unit 552 are known for example from Tokkai 8-296708 published by the Japanese Patent Office in 1996.

The remaining features of the construction are similar to those of the aforesaid first embodiment.

The lowpass filter time constant computing unit 453 determines the time constant $T_H$ of the lowpass filter of the external disturbance compensating unit 550, i.e. the cut-off frequency, from the time constant Tp which was found by the dynamic characteristic estimating unit 510 by the following process.

First, a time constant $T_H'$ is computed to give a gain margin of at least 12[dB] and a phase margin of at least 45 degrees so as to ensure stability of the speed change ratio control system. This time constant $T_H'$ is then corrected by the following equations based on the vehicle speed VSP and an arbitrary correction constant $C_{TH}$.

When $V_{C0} \leq VSP \leq V_{C1}$ $$T_H = \frac{T_H'}{C_{TH}} \tag{13}$$

When $VSP < V_{C0}$ or $V_{C1} < VSP$, $$T_H = T_H' \tag{14}$$

The external disturbance compensating unit 550 is designed to eliminate performance fluctuations (parameter fluctuations) in mass production due to dimensional errors in the manufacture of the transmission and errors due to external disturbances using the dynamic characteristics of the aforesaid equation (3) as a model. An output value $ip_D$ is then computed based on the following equation (15) from a speed change ratio command value ip described hereafter, the real speed change ratio $ip_R$, the time constant Tp and lowpass filter time constant $T_H$.

$$ip_D(t) = \frac{T_H \cdot s + 1}{Tp \cdot s + 1} \cdot ip_R(t) - \frac{ip(t)}{T_H \cdot s + 1} \cdot \exp(-L \cdot s) \tag{15}$$

The second term of equation (15) is calculated by the first external disturbance output compensating unit 551 and the first term is calculated by the second external disturbance output compensating unit 552, respectively.

If the output of the dynamic characteristic compensating unit 440 is ip', the speed change command value ip may be computed by the following equation (16) from ip' and the output value $ip_D$ of the external disturbance compensating unit 550.

$$ip = ip' - ip_D \tag{16}$$

By using the speed change command value ip computed in equation (16), in addition to the effect of the aforesaid first embodiment, speed change response characteristics according to design values may be obtained without being affected by parameter fluctuations due to dimensional errors of parts, or by external disturbances.

The above process will be described using the flowchart of FIG. 11. In this flowchart, steps S21–S25 are newly provided between the steps S9 and S10 of the flowchart of the aforesaid first embodiment shown in FIG. 4. According to this embodiment, the speed change ratio command value calculated in the step S9 is written as ip'.

First, in a step S21, the time constant $T_H$ of the lowpass filter is calculated by the aforesaid equations (13), (14). Using this time constant $T_H$, in a step S22, a second external disturbance compensating value corresponding to the first term of equation (15) is calculated, and in a step S23, a first external disturbance compensating value corresponding to the second term of equation (15) is calculated.

In a step S24, a difference of these compensating values is calculated as the output value $ip_D(t)$. In a step S25, a difference between the speed change ratio command value ip' of the step S9 and the output value $ip_D$ is output as the speed change ratio command value ip. In the step S10, the speed change ratio command value ip which is thereby output is converted into the step motor angular position command value θs.

The corresponding structures, materials, acts, and equivalents of all means plus function elements in the claims below are intended to include any structure, material, or acts for performing the functions in combination with other claimed elements as specifically claimed.

The embodiments of this invention in which an exclusive property or privilege is claimed are defined as follows:

What is claimed is:

1. A speed change ratio controller for a continuously variable transmission of a vehicle, said transmission having a V-belt looped around a pair of variable pulleys, said pulleys varying a radius of a contact part with the V-belt according to a first oil pressure supporting anyone of said pulleys and a second oil pressure supporting the other of said pulleys, said controller comprising:

a sensor for detecting a running state of a vehicle, a sensor for detecting a real speed change ratio of said transmission, an oil pressure supply unit for generating said first oil pressure, said first oil pressure varying according to said running state, a speed change control valve for adjusting the first oil pressure to the second pressure according to a speed change ratio command value, means for setting a target speed change ratio from said running state, means for calculating the first oil pressure based on said running state of the vehicle, means for estimating a dynamic characteristic of said transmission for each real speed change ratio of said transmission and for each value of the first oil pressure, and means for computing said speed change ratio command value based on said target speed change ratio and said dynamic characteristic.

2. A speed change ratio controller for a continuously variable transmission of a vehicle, said transmission having a V-belt looped around a pair of variable pulleys, said pulleys varying a radius of a contact part with the V-belt according to a first oil pressure supporting anyone of said pulleys and a second oil pressure supporting the other of said pulleys, said controller comprising:
- a sensor for detecting a running state of the vehicle,
- a sensor for detecting a real speed change ratio of said transmission,
- an oil pressure supply unit for generating said first oil pressure, said first oil pressure varying according to said running state,
- a speed change control valve for adjusting the first oil pressure to the second pressure according to a speed change ratio command value, and
- a microprocessor programmed to:
  - set a target speed change ratio from said running state,
  - calculate the first oil pressure based on said running state of the vehicle,
  - estimate a dynamic characteristic of said transmission according to the real speed change ratio of said transmission,
  - modify said dynamic characteristic according to the first oil pressure, and
  - compute said speed change ratio command value based on said target speed change ratio and a modified dynamic characteristic.

3. A speed change ratio controller as defined in claim 2, wherein said running state detecting sensor comprises a sensor for detecting a throttle opening of said engine, said oil pressure supply unit comprises a line pressure control valve for controlling a pressure of said oil pressure supply unit to said first oil pressure based on a pressure command signal calculated from the throttle opening of said engine, and said microprocessor is further programmed to calculate the first oil pressure based on the pressure command signal and a dynamic characteristic of said line pressure control valve.

4. A speed change ratio controller as defined in claim 2, wherein said microprocessor is further programmed to calculate a first external disturbance compensating value from a predetermined time constant and said speed change ratio command value, a second external disturbance compensating value from said time constant and said real speed change ratio, calculate an output value by subtracting said first external disturbance compensating value from said second external disturbance compensating value, and correct said speed change ratio command value by subtracting said output value from said speed change ratio command value.

5. A speed change ratio controller as defined in claim 2, wherein said microprocessor is further programmed to determine a speed change direction of said transmission, and estimate different dynamic characteristics of said transmission according to said speed change direction.

6. A speed change ratio controller as defined in claim 2, wherein said speed change control valve is driven by a step motor which varies an angular position according to a signal from said microprocessor, and said microprocessor is further programmed to convert said speed change ratio command value to said signal so that said speed change ratio command value and said real speed change ratio are in linear proportion.

7. A speed change ratio controller as defined in claim 4, wherein said microprocessor calculates said output value by the following equation:

$$ip_D(t) = \frac{T_H \cdot s + 1}{Tp \cdot s + 1} \cdot ip_R(t) - \frac{ip(t)}{T_H \cdot s + 1} \cdot \exp(-L \cdot s)$$

where, $ip_D$=output value, $\dfrac{T_H \cdot s + 1}{Tp \cdot s + 1} \cdot ip_R(t)$ = second external disturbance compensating value, $\dfrac{ip(t)}{T_H \cdot s + 1} \cdot \exp(-L \cdot s)$ = first external disturbance compensating value, $ip_R$=real speed change ratio,
ip=speed change ratio command value,
$T_H$=lowpass filter time constant,
Tp=time constant of continuously variable transmission,
s=Laplacian operator.
L=dead time.

8. A speed change ratio controller as defined in claim 6, wherein said microprocessor converts said speed change ratio command value to said signal based on a relation between a drive pulley groove width Ds and the speed change ratio ip obtained from the following equations (a), (b), (c):

$$r_1 = \frac{D_S}{2 \cdot \tan\beta} + r_{10} \tag{a}$$

$$r_0 = \frac{2 \cdot r_1 - \pi \cdot Dc + \sqrt{(2 \cdot r_1 - \pi \cdot Dc)^2 - 4 \cdot \{r_1^2 + \pi \cdot Dc \cdot r_1 + Dc \cdot (2 \cdot Dc - L \cdot s)\}}}{2} \tag{b}$$

$$ip = \frac{r_0}{r_1} \tag{c}$$

where,
$r_1$=radius of belt contact part of drive pulley,
$r_{10}$=minimum radius of belt contact part of drive pulley,
$r_0$=radius of belt contact part of driven pulley,
Ds=variation amount of groove width of drive pulley from the value corresponding to minimum radius of belt contact part of drive pulley,
Dc=distance between drive pulley and driven pulley,
$L_B$=belt circumference,
β=sheave angle of drive pulley.

* * * * *